(12) United States Patent
Wang

(10) Patent No.: US 10,251,479 B2
(45) Date of Patent: Apr. 9, 2019

(54) READING LAMP

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventor: Hongyun Wang, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

( * ) Notice: Subject to any disclaimer, the term of this patent is extended or adjusted under 35 U.S.C. 154(b) by 477 days.

(21) Appl. No.: 14/894,193

(22) PCT Filed: Jul. 22, 2015

(86) PCT No.: PCT/CN2015/084762
§ 371 (c)(1),
(2) Date: Nov. 25, 2015

(87) PCT Pub. No.: WO2016/107151
PCT Pub. Date: Jul. 7, 2016

(65) Prior Publication Data
US 2016/0353881 A1    Dec. 8, 2016

(30) Foreign Application Priority Data

Jan. 4, 2015    (CN) .......................... 2015 1 0001023

(51) Int. Cl.
*A47B 23/06*    (2006.01)
*F21V 23/00*    (2015.01)
(Continued)

(52) U.S. Cl.
CPC ............ *A47B 23/06* (2013.01); *F21V 23/003* (2013.01); *G02B 6/0036* (2013.01);
(Continued)

(58) Field of Classification Search
CPC ..... A47B 23/06; F21V 23/003; G02B 6/0036; G02B 6/0058; G02B 6/0078; G02B 6/0088
(Continued)

(56) References Cited

U.S. PATENT DOCUMENTS 4,751,615 A * 6/1988 Abrams .................... B42D 3/18
362/604
6,666,563 B2 * 12/2003 Brown ...................... F21S 8/00
362/190
(Continued)

FOREIGN PATENT DOCUMENTS

CN    101476685 A    7/2009
CN    101718887 A    6/2010
(Continued)

OTHER PUBLICATIONS

First Chinese Office Action dated Dec. 5, 2016; Appln. No. 201510001023.9.

(Continued)

*Primary Examiner* — Bryon T Gyllstrom
(74) *Attorney, Agent, or Firm* — Ladas & Parry LLP; Loren K. Thompson

(57) ABSTRACT

A reading lamp, by which, the limitation of illuminated and magnified zones of a known flat-panel reading lamp is overcome. The reading lamp does not need to be manually moved many times in use, so that it is convenient to carry and easy for operation. The reading lamp includes a splicable optical module and a luminous module, wherein, the splicable optical module includes a plurality of light guiding plates, at one face of each of which, there is provided a Fresnel thread, and at another face of each of which, there are arranged optical lattice points with uneven density; the plurality of light guiding plates can be spliced with each
(Continued)

other; a light exiting end of the luminous module is connected to an upper end of the splicable optical module.

16 Claims, 6 Drawing Sheets

(51) Int. Cl.
  *F21V 8/00* (2006.01)
  *F21W 131/30* (2006.01)
  *A47B 23/04* (2006.01)

(52) U.S. Cl.
  CPC ......... *G02B 6/0058* (2013.01); *G02B 6/0078* (2013.01); *G02B 6/0088* (2013.01); *A47B 23/043* (2013.01); *F21W 2131/3005* (2013.01)

(58) Field of Classification Search
  USPC .......................................................... 362/611
  See application file for complete search history.

(56) References Cited

U.S. PATENT DOCUMENTS

| | | | |
|---|---|---|---|
| 6,986,600 B2* | 1/2006 | Yamada | G01D 11/28 362/560 |
| 7,121,709 B2* | 10/2006 | Shinohara | G02B 6/0036 362/330 |
| 8,547,500 B2* | 10/2013 | Kang | G02B 6/0088 349/58 |
| 2007/0047246 A1 | 3/2007 | Barowski et al. | |
| 2007/0097709 A1* | 5/2007 | Hsieh | G02B 6/0038 362/620 |
| 2008/0037284 A1* | 2/2008 | Rudisill | F21S 2/005 362/629 |
| 2008/0084693 A1 | 4/2008 | Shimada et al. | |
| 2008/0130307 A1* | 6/2008 | Reeves | B60R 19/18 362/505 |
| 2010/0091518 A1* | 4/2010 | Su | F21V 5/002 362/606 |
| 2011/0085112 A1* | 4/2011 | Inditsky | G02F 1/133606 349/65 |

FOREIGN PATENT DOCUMENTS

| | | |
|---|---|---|
| CN | 203202781 A | 9/2013 |
| CN | 104483734 A | 4/2015 |

OTHER PUBLICATIONS

The Second Chinese Office Action dated Jun. 2, 2017; Appln. No. 201510001023.9.
The Third Chinese Office Action dated Jul. 27, 2017: Appln. No. 201510001023.9.
International Search Report & Written Opinion Appln. No. CT/CN2015/084762; dated Oct. 9, 2015.

* cited by examiner

READING LAMP

TECHNICAL FIELD

Embodiments of the present invention relate to a reading lamp.

BACKGROUND

In order to adapt to the ceaseless increasing of people's reading demands in a variety of environments, the application of flat-panel reading lamps has become popularized gradually. As compared to a conventional desk lamp or other illuminating tool, a transparent flat panel tightly appressed to readings is used in a flat-panel reading lamp for illumination, and thus it has the traits of providing even and soft lights, providing eyesight protection, and causing no disturbance to others. Illumination for a known flat-panel reading lamp is usually implemented with a transparent light guiding plate; in order to facilitate reading of olders or other amblyopic population, a magnifier is also added on top of the light guiding plate, so that illumination is realized and meanwhile corresponding reading information can be magnified.

However, illuminated and magnified zones of this known flat-panel reading lamp are limited, and only a certain range of reading can be covered by it. Therefore, when a fulltext reading is made by using this flat-panel reading lamp, position of the reading lamp needs to be continually changed by hand many times according to different positions seen by eyes, and it is very troublesome for use. Furthermore, if the area of the reading lamp is increased with the aim of expanding the scope of reading, then this also makes it extremely inconvenient to carry.

SUMMARY

According to at least one embodiment of the present invention, there is provided a reading lamp, which is capable of solving the issue of a known flat-panel reading lamp that the illuminated and magnified zones of it is limited and this renders it necessary that the reading lamp be manually moved many times by user in use, and which is also convenient to carry and easy for operation while illumination and magnification are achieved by it, improving the usage effect of user.

A reading lamp provided by an embodiment of the invention includes a splicable optical module and a luminous module, a light exiting end of the luminous module being connected to an upper end of the splicable optical module, wherein, the splicable optical module includes a plurality of light guiding plates, at one face of each light guiding plate, there is provided a Fresnel thread, and at another face of each light guiding plate, there are arranged optical lattice points with uneven density; the plurality of light guiding plates are configured to be capable of being spliced with each other.

In an example, the reading lamp further includes a book support module, wherein, the book support module is connected to an opposite end of the luminous module with respect to the light exiting end; and the book support has a supporting area configured to place books, and the supporting area is adjustable.

In an example, the book support module includes an extendable rod arranged horizontally, an extendable face, a supporting face and a base arranged horizontally, wherein, the extendable rod includes a first connector, a first hollow rod arranged horizontally and a first hidden rod arranged horizontally, wherein, an end of the first connector is connected to an end of the first hollow rod; the other end of the first hollow rod is connected to an end of the first hidden rod; and the first hidden rod reaches into the first hollow rod and is movable along the first hollow rod;

the extendable face includes a second hidden rod arranged perpendicularly, a first hidden face arranged horizontally and a second hollow rod arranged perpendicularly, wherein, an end of the second hidden rod is connected to another end of the first connector; the other end of the second hidden rod is connected to an end of the second hollow rod; one side of the second hollow rod is connected to a first side of the first hidden face; a second side of the first hidden face is connected to a first side of the supporting face, wherein, the first side of the first hidden face and the second side of the first hidden face are parallel to each other;

the supporting face is a hollow structure; the second hidden rod reaches into the second hollow rod and is movable along the second hollow rod; the first hidden face reaches into the supporting face and is movable along a second side of the supporting face, wherein, the first side of the supporting face is joined to the second side of the supporting face;

the base is connected to a third side of the supporting face; and a preset angle is present between the extendable rod and the second hidden rod.

In an example, the extendable rod further includes a second connector, and the extendable face further include a third hidden rod arranged perpendicularly, a second hidden face arranged horizontally and a third hollow rod arranged perpendicularly, wherein, an end of the second connector is connected to the other end of the first hidden rod, another end of the second connector is connected to an end of the third hidden rod;

the other end of the third hidden rod is connected to a first side of the second hidden face; a preset angle is present between the third hidden rod and the extendable rod;

a second side of the second hidden face is connected to a third side of the supporting face, wherein, the first side of the second hidden face is parallel to a second side of the second hidden face; and the second hidden face reaches into the supporting face and is movable along the second side of the supporting face.

In an example, a sum of length of the first hollow rod and length of the first hidden rod is equal to a sum of length of one of sides of the supporting face in parallel to the extendable rod and length of one of sides of the first hidden face in parallel to the extendable rod.

In an example, a sum of length of a side of the first hidden face that moves along the supporting face and length of a side of the second hidden face that moves along the supporting face is smaller than or equal to length of the second side of the supporting face; and a sum of length of the first hollow rod and length of the first hidden rod is equal to a sum of length of one of sides of the supporting face in parallel to the extendable rod, and length of one of sides of the first hidden face in parallel to the extendable rod and length of one of sides of the second hidden face in parallel to the extendable rod.

In an example, the luminous module includes a pulse signal generator, a brightness control button, a pulse width modulator, a counter, a resistor, a power supply, a lamp and a triode, wherein, an output terminal of the pulse signal generator is connected to a first input terminal of the pulse width modulator;

a second input terminal of the pulse width modulator is connected to the brightness control button, an output terminal of the pulse width modulator is connected to an input terminal of the counter;

an output terminal of the counter is connected to a base of the triode, a collector of the triode is connected to an end of the resistor, and an emitter of the triode is connected to an end of the lamp;

the other end of the resistor is connected to the power supply; and the other end of the lamp is grounded.

In an example, the splicable optical module further includes housings, the number of which is the same as that of the light guiding plates, wherein, the housings are disposed at the surroundings of each of the light guiding plates.

In an example, the plurality of light guiding plates are spliced with each other through a concave-convex matching structure.

In an example, the concave-convex matching structure includes a rectangular protrusion and a rectangular depression.

In an example, the concave-convex matching structure includes an I-shaped protrusion and I-shaped depression.

In an example, the luminous module and the splicable optical module are connected by an engaging structure.

In an example, the book support module further includes a stopping groove, wherein, the stopping groove is connected to a fourth side of the supporting face, and its size is configured to fix a book on the supporting face.

The configuration of a splicable optical module and a luminous module is used in the reading lamp provided by embodiments of the invention, wherein, the splicable optical module is formed by using a plurality of light guiding plates that can be spliced, a Fresnel thread is provided at one face of each of the light guiding plates, and lattice-points with uneven density are arranged at another face of it. As such, when the reading lamp is used by a user for reading, with respect to books of a larger size, a larger number of light guiding plates (multiple light guiding plates) may be spliced together for illumination and magnification; with respect to books of a smaller size, it is possible that one light guiding plate is directly adopted or a smaller number of light guiding plates (a few light guiding plates) are spliced together for illumination and magnification. Finally, illumination and magnification of a variety of books of different sizes are realized, and the limitation of illuminated and magnified zones of a known flat-panel reading lamp is overcome. The reading lamp does not need to be manually moved many times when it is used by a user, so that it is convenient to carry and easy for operation, and the usage effect of the user is improved.

BRIEF DESCRIPTION OF THE DRAWINGS

Embodiments of the present invention will be described in more detail below in conjunction with attached drawings, so that the present invention is understood by those ordinarily skilled in the art more clearly. In the drawings.

DETAILED DESCRIPTION

In order to make objects, technical details and advantages of the embodiments of the invention apparent, hereinafter, the technical solutions in the embodiments of the invention will be described in a clearly and fully understandable way in connection with the drawings in the embodiments of the invention. It is obvious that the described embodiments are just a part but not all of the embodiments of the invention. Based on the described exemplary embodiments of the invention, those ordinarily skilled in the art can obtain other embodiment(s), without any inventive work, which should be within the scope sought for protection by the invention.

Unless otherwise defined, the technical terminology or scientific terminology used herein should have the same meaning as commonly understood by one of ordinary skill in the art to which this invention belongs. "First", "second" and the like used in the specification and claims of patent application of the present invention do not show any order, number or importance, but are only used to distinguish different constituent parts. Likewise, term "a," "an," or the like does not indicate limitation in number, but specifies the presence of at least one. Term "comprises," "comprising," "includes," "including", "contains" or the like means that an element or article ahead of this term encompasses element(s) or article(s) listed behind this term and its(their) equivalents, but does not preclude the presence of other elements or articles. "Upper," "lower," or the like is only used to describe a relative positional relationship, and when an absolute position of the described object is changed, the relative positional relationship might also be changed accordingly.

Figure 1:
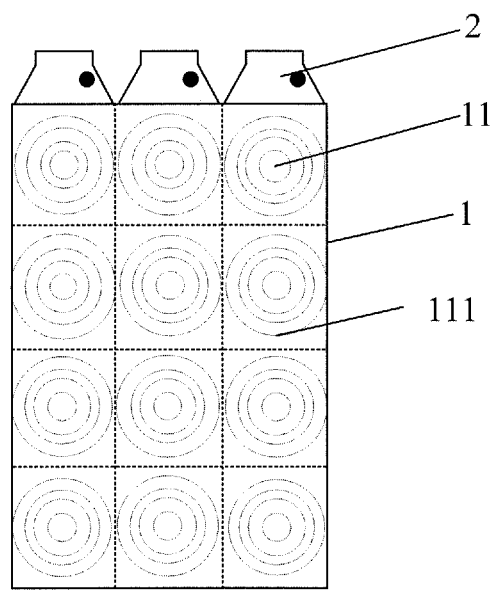
FIG. 1 is a structurally schematic view illustrating a reading lamp provided by an embodiment of the invention.
Figure 2:
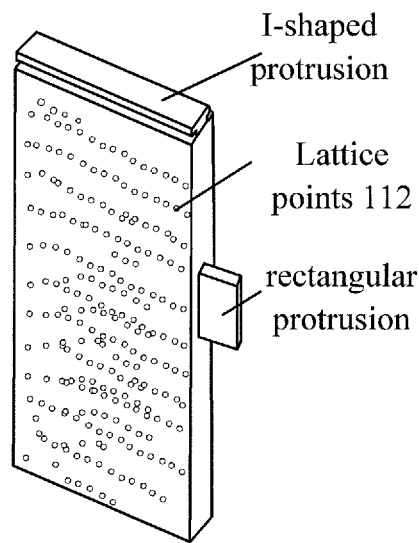
FIG. 2 is a structurally schematic view illustrating a light guiding plate in a splicable optical module in a reading lamp provided by an embodiment of the invention.

According to an embodiment of the invention, there is provided a reading lamp. Referring to FIG. 1 and FIG. 2, the reading lamp includes a splicable optical module 1 and a luminous module 2.

The splicable optical module 1 includes a plurality of light guiding plates 11, a Fresnel thread is provided at one face of each of the light guiding plates 11, and optical lattice-points 112 with uneven density are arranged at another face of each of the light guiding plates.

The plurality of light guiding plates can be spliced with each other together.

Figure 3:
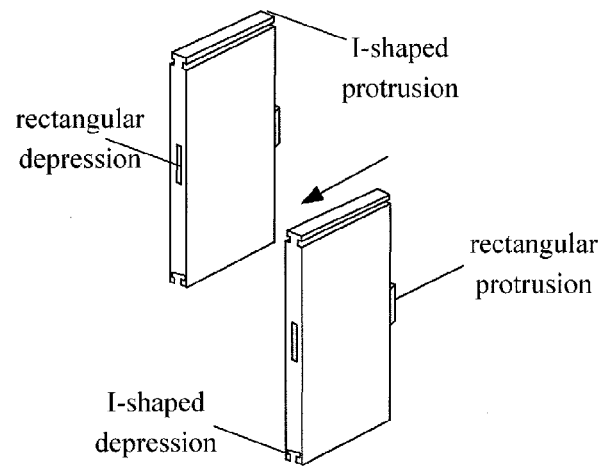
FIG. 3 is a schematic view illustrating the splicing configuration of a splicable optical module in a reading lamp provided by an embodiment of the invention.
Figure 4:
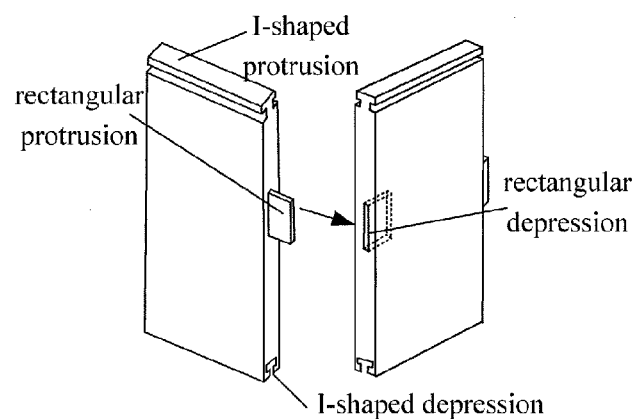
FIG. 4 is a schematic view illustrating the splicing configuration of a splicable optical module in another reading lamp provided by an embodiment of the invention.

In one example, the outside of each of the light guiding plates 11 in the splicable optical module 1 is cladded with a housing 12, that is, the number of housings 12 is the same as the number of light guiding plates 11. For example, splicing sites of each of the light guiding plates 11 are convex-concave matched. For example, as illustrated in FIG. 3 and FIG. 4, an upper end of a housing 12 has an I-shaped protrusion, its lower end has an I-shaped depression, there is a rectangular protrusion on one side at the end of it to the right, and there is a rectangular depression on one side at the end of it to the left. As such, when splicing of light guiding plates 11 is made, upper and lower ends may be spliced together with the aid of the I-shaped protrusion and the I-shaped depression, and left and right sides may be spliced together with the aid of the rectangular protrusion and the rectangular depression. For example, for the splicing convenience, when light guiding plates 11 are spliced, it may be executed in the following order: upper and lower ends are spliced earlier, and left and right sides are spliced later.

In an example, with the aim of ensuring that there is a light beam at every location of the formed splicable optical module 1, in the actual design, the left side of a housing 12 of a light guiding plate 11 located on the leftmost side of the whole splicable optical module 1 may be not provided with, such as, a rectangular depression, and the right side of a housing 12 of a light guiding plate 11 located on the rightmost side of the whole splicable optical module 1 may be not provided with, such as, a rectangular protrusion.

In an example, for the sake of ensuring a better optical effect, in the actual design, the fit tolerance of the above depression and protrusion may be as small as possible, so that the depression and the protrusion can be tightly appressed.

It is to be noted that, the splicing mode of light guiding plates in the embodiment is merely for illustration, but is not aimed at limiting the scope of the invention. In actual applications, any mode known in the field by which light guiding plates can be spliced together is suitable.

In an example, a light exiting end of a luminous module 2 is connected to an upper end of the splicable optical module 1.

Figure 5:
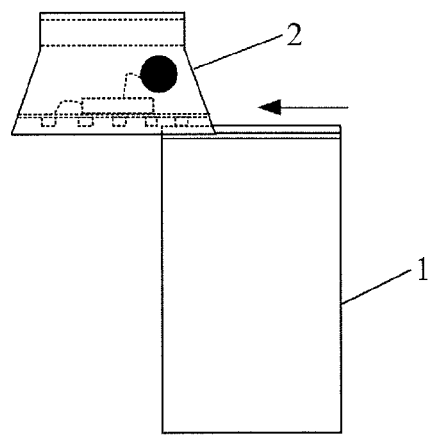
FIG. 5 is a schematic view illustrating the splicing configuration of a luminous module and a splicable optical module of a reading lamp provided by an embodiment of the invention.

For example, as illustrated in FIG. 5, the luminous module 2 has a holder, there is a latch groove at the bottom of the holder, and the latch groove and the upper end of the splicable optical module 1 may be engaged together, so as to achieve connection of the luminous module 2 and the splicable optical module 1. It is to be noted that, the connecting mode of the luminous module and the splicable optical module in the embodiment is merely for illustration, and is not aimed at limiting the scope of the invention. In actual applications, any mode known in the field by which the luminous module and the splicable optical module can be connected together is suitable.

The configuration of a splicable optical module and a luminous module is used in the reading lamp provided by embodiments of the invention, wherein, the splicable optical module includes a plurality of light guiding plates that can be spliced, a Fresnel thread 111 is provided at one face of each of the light guiding plates, and lattice-points 112 with uneven density are arranged at another face of it. As such, when the reading lamp is used by a user for reading, with respect to books of a larger size, a larger number of light guiding plates (multiple light guiding plates) may be spliced together for illumination and magnification; with respect to books of a smaller size, it is possible that one light guiding plate is directly adopted or a smaller number of light guiding plates (a few light guiding plates) are spliced for illumination and magnification. Finally, illumination and magnification of a variety of books of different sizes are realized, and the limitation of illuminated and magnified zones of a known flat-panel reading lamp is overcome. The reading lamp does not need to be manually moved many times when it is used by a user, so that it is convenient to carry and easy for operation, and the usage effect of the user is improved.

In one embodiment of the invention, the reading lamp further includes a book support module 3, configured for placement of books. For example, the book support module 3 is connected to another end of the luminous module 2 opposed to the light exiting end.

Figure 6:
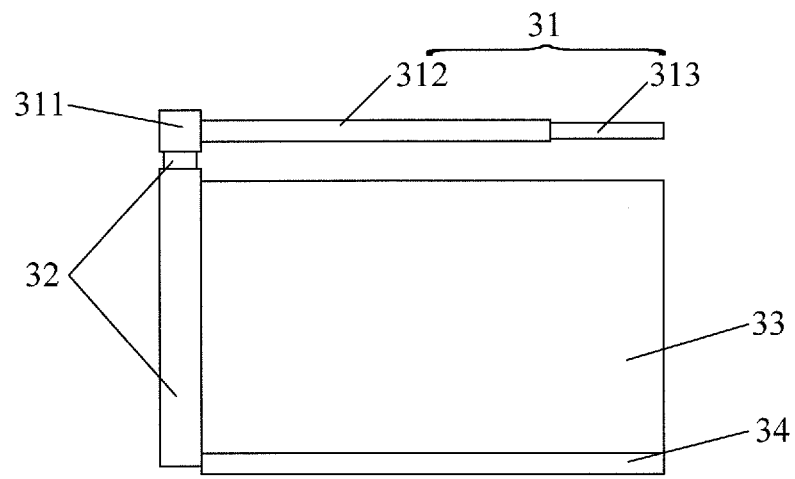
FIG. 6 is a structurally schematic view illustrating a book support module of a reading lamp provided by an embodiment of the invention.

In one embodiment of the invention, area for placement of books in the book support module 3 can be adjusted according to size of books. For example, referring to FIG. 6, the book support module 3 includes an extendable face 32, a supporting face 33, an extendable rod 31 arranged horizontally, and a base 34 arranged horizontally.

In an example, the extendable rod 31 includes a first connector 311, a first hollow rod 312 arranged horizontally and a first hidden rod 313 arranged horizontally.

For example, an end of the first connector 311 is connected to an end of the first hollow rod 312; and the other end of the first hollow rod 312 is connected to an end of the first hidden rod 313; and the first hidden rod 313 reaches into the first hollow rod 312 and is movable along the first hollow rod 312. The first connector 311 has a through hole so as to be connected to the first hollow rod 312; with the aim of firmly connecting the first hollow rod 312 and the first connector 311, a fixed end may be arranged on the first connector 311. The end-face diameter of the fixed end may be larger than diameter of the first hollow rod 312, and may be larger than the outer diameter of the through hole, and the diameter of the first hollow rod 312 may be smaller than the inner diameter of the through hole.

Certainly, the connecting mode of the first connector and the first hollow rod in the extendable rod is only described by giving examples in the above embodiment, but the present invention is not limited to this. In the actual design, any mode by which the connector and the hollow rod can be connected together is suitable.

Figure 7:
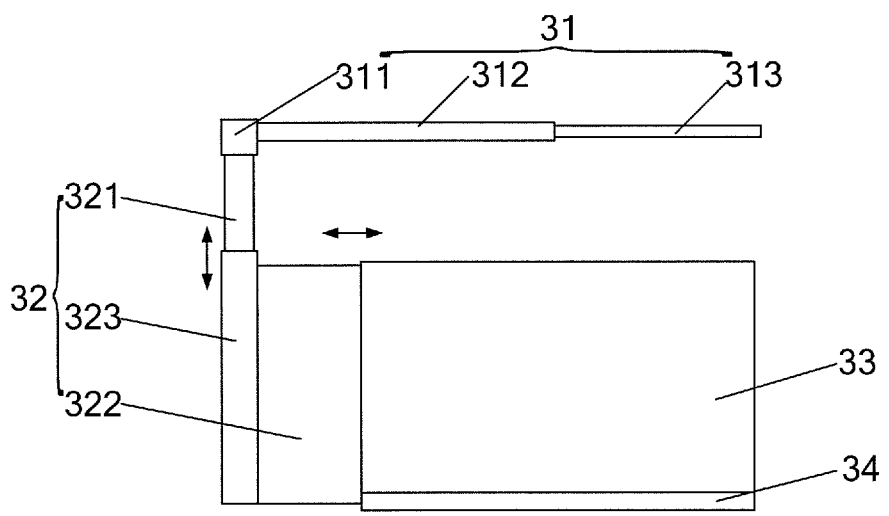
FIG. 7 is a structurally schematic view illustrating another book support module of a reading lamp provided by an embodiment of the invention.

In an example, referring to FIG. 7, the extendable face 32 includes a second hidden rod 321 arranged perpendicularly, a first hidden face 322 arranged horizontally and a second hollow rod 323 arranged perpendicularly.

For example, an end of the second hidden rod 321 is connected to another end of the first connector 311, and the other end of the second hidden rod 321 is connected to an end of the second hollow rod 323. One side of the second hollow rod 323 is connected to a first side of the first hidden face 322. A second side of the first hidden face 322 is connected to a first side of the supporting face 33, wherein, the second side of the first hidden face 322 and the aforesaid first side of it that is connected to one side of the second hollow rod 323 are parallel to each other. The second hidden rod 321 reaches into the second hollow rod 323 and is movable along the second hollow rod 323. The inside of the supporting face 33 is a hollow structure, and the first hidden face 322 reaches into the supporting face 33 and is movable along a second side of the supporting face 33, wherein, the second side of the supporting face 33 is joined to the aforesaid first side of it that is connected to the second side of the first hidden face 322. The base 34 is connected to a third side of the supporting face 33. A certain angle is formed between the extendable rod 31 and the second hidden rod 321.

Figure 8:
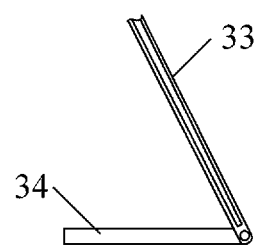
FIG. 8 is a schematic view illustrating a connecting configuration of a base of a book support module provided by an embodiment of the invention.
Figure 9:
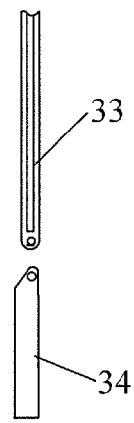
FIG. 9 is a schematic view illustrating another connecting configuration of a base of a book support module provided by an embodiment of the invention.

For example, as illustrated in FIG. 8, the base 34 is connected to the one side (the third side) of the supporting face 33 that is lowermost, and the angle between the base 34 and the supporting face 33 may be adjusted according to the user's wishes, and may be clipped with such as a clip after adjustment, so as to prevent the angle between the base 34 and the supporting face 33 from changed after books are placed over the supporting face 33. For example, as illustrated in FIG. 9, the side of the base 34 that is connected to the supporting face 33 may be designed to be a sloping side with a sloping angle of 60 degrees, and so, the angle between the desktop and the supporting plane that is ultimately formed after the base 34 and the supporting face 33 are connected together can be fixed to be 60 degrees. Whereby, this endows a reader with the most comfortable posture to read books, and meanwhile, with the posture, it is also possible that eyes of a reader are protected and the reader is avoided from being humpbacked.

In an example, a sum of length of the first hollow rod 312 and length of the first hidden rod 313 is equal to a sum of length of one of sides of the supporting face 33 in parallel to the extendable rod 31 and length of one of sides of the first hidden face 322 in parallel to the extendable rod 31.

Figure 10:
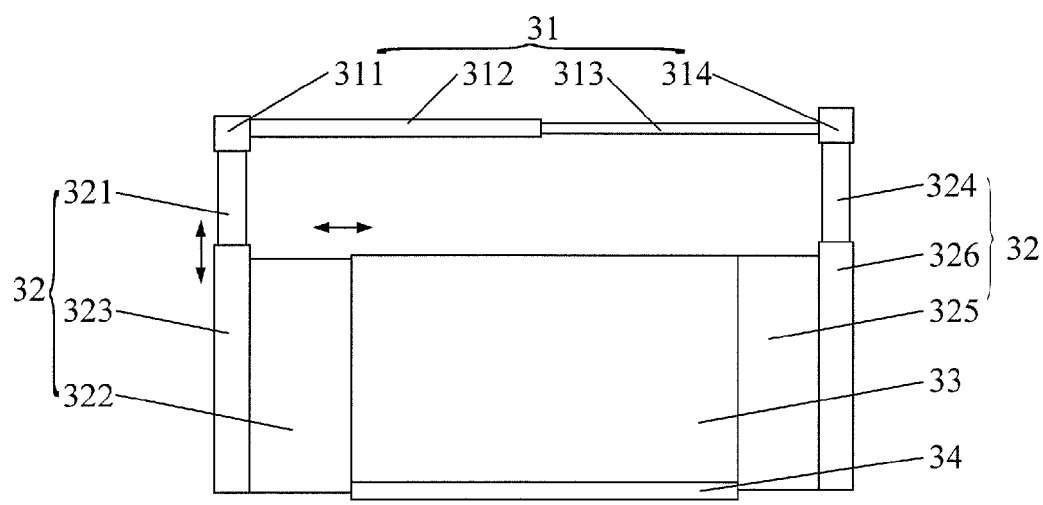
FIG. 10 is a structurally schematic view illustrating still another book support module of a reading lamp provided by an embodiment of the invention.

In an example, referring to FIG. 10, the extendable rod 31 further includes a second connector 314; and the extendable face 32 further includes a third hidden rod 324 arranged perpendicularly, a second hidden face 325 arranged horizontally and a third hollow rod 326 arranged perpendicularly.

For example, an end of the second connector 314 is connected to the other end of the first hidden rod 313, and another end of the second connector 314 is connected to an end of the third hidden rod 324. The other end of the third hidden rod 324 is connected to a first side of the second hidden face 325, and a certain angle is formed between the third hidden rod 324 and the extendable rod 31. A second side of the second hidden face 325 is connected to a third side of the supporting face 33, and the second side of the second hidden face 325 is parallel to the aforesaid first side of it that is connected to the other end of the third hidden rod 324. The second hidden face 325 reaches into the supporting face 33 and is movable along the second side of the supporting face 33.

In an example, a circularly arcuate protrusion may be provided at either side of the bottom end of the supporting face 33, and a through hole is present in the protrusion, so as to be connected to the base 34 with the aid of the through hole on the protrusion.

In an example, diameter of the second hollow rod 323 is larger than thickness of the first hidden face 322, diameter of the second hollow rod 323 is slightly larger than thickness of the supporting face 33, and thickness of the first hidden face 322 is smaller than thickness of the hollow portion of the supporting face 33. Diameter of the third hollow rod 326 is larger than thickness of the second hidden face 325, diameter of the third hollow rod 326 is slightly larger than thickness of the supporting face 33, and thickness of the second hidden face 325 is smaller than thickness of the hollow portion of the supporting face 33.

In an example, diameter of the second hollow rod 323 is equal to diameter of the third hollow rod 326, and thickness of the first hidden face 322 is equal to thickness of the second hidden face 325. In this way, it can be ensured that the first hidden face 322 reaches into the supporting face 33 and moves, the second hidden face 325 reaches into the supporting face 33 and moves. Whereby, adjustability of available placing area of the book support module 3 is realized, so as to place a variety of books of diverse size.

For example, a sum of length of a side of the first hidden face 322 that moves along the supporting face 33 and length of a side of the second hidden face 325 that moves along the supporting face 33 is smaller than or equal to length of the second side of the supporting face 33.

For example, a sum of length of the first hollow rod 312 and length of the first hidden rod 313 is equal to a sum of length of one of sides of the supporting face 33 in parallel to the extendable rod 31, length of one of sides of the first hidden face 322 in parallel to the extendable rod 31 and length of one of sides of the second hidden face in parallel to the extendable rod.

Figure 11:
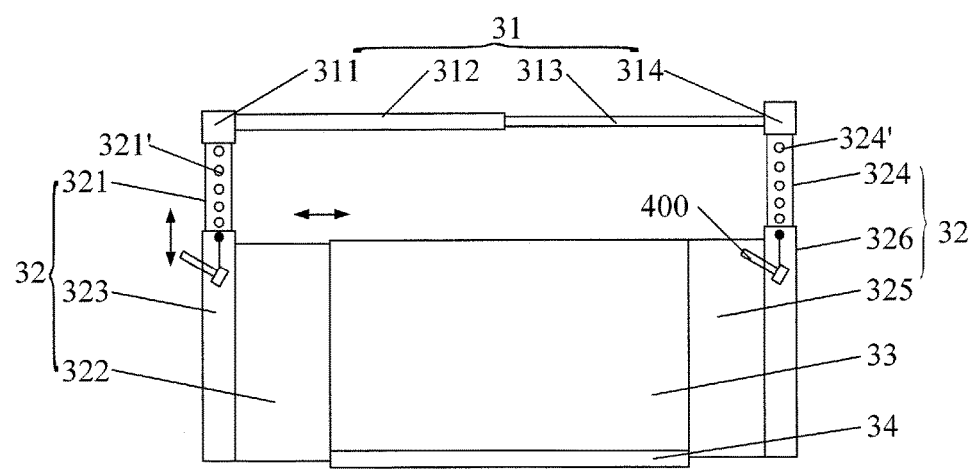
FIG. 11 is a structurally schematic view illustrating yet still another book support module of a reading lamp provided by an embodiment of the invention.

In an example, as illustrated in FIG. 11, a plurality of via holes 321' and 324' through the second hidden rod 321 and the third hidden rod 324 are provided in the second hidden rod 321 and the third hidden rod 324, respectively, and after protruding lengths of the second hidden rod 321 and the third hidden rod 324 are adjusted, bolts 400 are inserted to via holes 321' and 324' corresponding to the current position, so as to fix the second hidden rod 321 and the third hidden rod 324 in the protruding position. Whereby, the following case is avoided: the second hidden rod 321 and the third hidden rod 324 slide downward and thus books may not be placed. For example, the end-face diameter of corresponding ones of ends of the bolts 400 may be larger than diameter of through holes of the second hidden rod 321 and the third hidden rod 324, and the end-face diameter of the other ones of ends of the bolts 400 may be smaller than diameter of through holes of the second hidden rod 321 and the third hidden rod 324, for the convenience of playing a fixing role.

Figure 12:
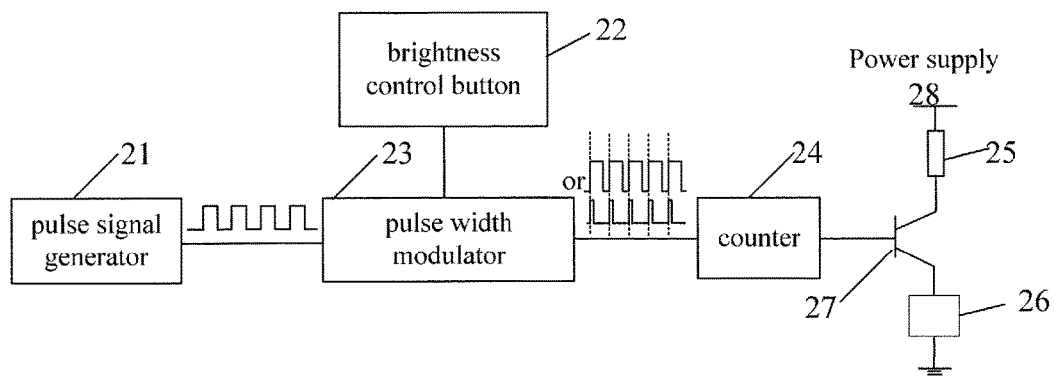
FIG. 12 is a structurally schematic view illustrating a luminous module of a reading lamp provided by an embodiment of the invention.
Figure 13:
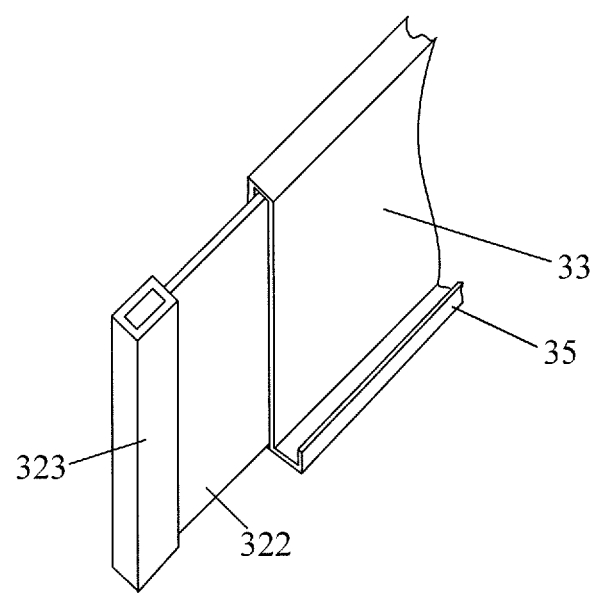
FIG. 13 is a structurally schematic view illustrating a book support module of another reading lamp provided by an embodiment of the invention.

In an example, referring to FIG. 12, the luminous module 2 includes a pulse signal generator 21, a brightness control button 22, a pulse width modulator 23, a counter 24, a resistor 25, a power supply 28, a lamp 26 and a triode 27.

For example, an output terminal of the pulse signal generator 21 is connected to a first input terminal of the pulse width modulator 23. A second input terminal of the pulse width modulator 23 is connected to the brightness control button 22, and an output terminal of the pulse width modulator 23 is connected to an input terminal of the counter 24. An output terminal of the counter 24 is connected to a base of the triode 27, a collector of the triode 27 is connected to an end of the resistor 25, and an emitter of the triode 27 is connected to an end of the lamp 26. The other end of the resistor 25 is connected to the power supply 28; and the other end of the lamp 26 is grounded.

In an example, connection between the luminous module 2 and the splicable optical module 1 is convex-concave matching.

There is no limit on the type of the lamp in the embodiment, and any lamp capable of giving out light is suitable.

With the luminous module provided in embodiments of the invention, control of the lighting time of the lamp is actualized by the control of the counter. For example, it is possible that the reading lamp is set to be automatically extinguished after it is used for one hour, and after that, only by restart can the reading lamp be turned on once more by the reader, so as to remind the reader that the reading time is too long, and to avoid the long-time fatigued working of reader's eyes. Of course, the other end of the brightness control button may be output to the outside of the luminous module, so that the lightness of the reading lamp can be adjusted by the reader by means of manually turning the brightness control button, to satisfy the reader's different needs. In an example, the duty ratio of a pulse signal can be changed by manually rotating the brightness control knob, so as to control the degree of light and shade of the lamp. At this time, although the duty ratio is changed, the pulse cycle is invariant, and the lighting time is obtained by recording the pulse number with the counter. When the lighting time exceeds one hour, a low level is output from the pulse width modulator, the triode is turned off, and the LED stops giving out lights.

In an example, referring to FIG. 12, the book support module 3 further includes a stopping groove 35.

For example, the stopping groove 35 is connected to a fourth side of the supporting face 33.

For example, the stopping groove 35 is configured to fix books, and its height H is configured to prevent a book placed on the supporting face 33 from sliding down, and meanwhile to prevent that part of pages in the book that has not been read from turning over automatically.

In a specific design, for example, it is unsuitable for width W (i.e. the protruding extent) of the stopping groove 35 to be overlarge, and an appropriate width can be chosen according to aesthetic level, specific requirements and so on.

It is to be noted that, the splicable optical module in the reading lamp provided by the embodiment may further include a fixing rod, and the fixing rod is inserted in an I-shaped depression of a housing of the whole splicable optical module when the reading lamp is in use, so as to serve a function of firmly fixing the whole splicable optical module. Whereby, occurrence of unstable circumstance is avoided in the event that the number of light guiding plates in the splicable optical module is overlarge. The number of light guiding plates can be determined according to the specifically designed size of light guiding plates and the size of a book in need of reading actually.

The configuration of a splicable optical module and a luminous module is used in the reading lamp provided by embodiments of the invention, wherein, the splicable optical module includes a plurality of light guiding plates that can be spliced, a Fresnel thread is provided at one face of each of the light guiding plates, and lattice-points with uneven density are arranged at another face of it. As such, when the reading lamp is used by a user for reading, with respect to books of a larger size, a larger number of light guiding plates (multiple light guiding plates) may be spliced together for illumination and magnification; with respect to books of a smaller size, it is possible that one light guiding plate is directly adopted or a smaller number of light guiding plates (a few light guiding plates) are spliced together for illumination and magnification. Finally, illumination and magnification of a variety of books of different sizes are realized, and the limitation of illuminated and magnified zones of a known flat-panel reading lamp is overcome. The reading lamp does not need to be manually moved many times when it is used by a user, so that it is convenient to carry and easy for operation, and the usage effect of the user is improved.

The above embodiments are merely used for illustrating the invention, but not limitative of the invention. Various changes and variants can also be made by those ordinarily skilled in the related art without departing the spirit and scope of the invention, and thus all the equivalent technical schemes fall within the scope of the invention as well. The patent protection scope of the invention shall be defined by claims.

This application claims the benefit of priority from Chinese patent application No. 201510001023.9, titled "a reading lamp" and filed on Jan. 4, 2015, the disclosure of which is incorporated herein in its entirety by reference as a part of the present application.

The invention claimed is:

1. A reading lamp, comprising a splicable optical module and a luminous module, a light exiting end of the luminous module being connected to an upper end of the splicable optical module, wherein,
   the splicable optical module includes a plurality of light guiding plates, at one face of each light guiding plate, there is provided a Fresnel thread, and at another face of each light guiding plate, there are arranged optical lattice points with uneven density; the plurality of light guiding plates are configured to be capable of being spliced with each other,
   the reading lamp further comprising a book support module, wherein,
   the book support module is connected to an opposite end of the luminous module with respect to the light exiting end; and
   the book support has a supporting area configured to place books, and the supporting area is adjustable and
   the book support module comprises a first adjusting component configured to adjust a horizontal dimension of the supporting area, and a second adjusting component configured to adjust a vertical dimension of the supporting area,
   the first adjusting component comprises: a supporting face being a hollow structure; a first hidden surface capable of reaching into the supporting face and movable along the supporting face horizontally; a first hollow rod arranged horizontally; and a first hidden rod arranged horizontally, the first hidden rod being capable of reaching into the first hollow rod and movable along the first hollow rod; and
   the second adjusting component comprises: a second hollow rod arranged perpendicularly; and a second hidden rod arranged perpendicularly, the second hidden rod being capable of reaching into the second hollow rod and movable along the second hollow rod.

2. The reading lamp claimed as claim 1
   wherein, the book support module further includes: an extendable rod arranged horizontally, including a first connector, the first hollow rod and the first hidden rod, wherein an end of the first connector is connected to an end of the first hollow rod; the other end of the first hollow rod is connected to an end of the first hidden rod;
   an extendable face including the second hidden rod, the first hidden face and the second hollow rod, wherein an end of the second hidden rod is connected to another end of the first connector; the other end of the second hidden rod is connected to an end of the second hollow rod; one side of the second hollow rod is connected to a first side of the first hidden face; a second side of the first hidden face is connected to a first side of the supporting face, wherein the first side of the first hidden face and the second side of the first hidden face are parallel to each other; the first hidden face is movable along a second side of the supporting face, the first side of the supporting face is joined to the second side of the supporting face;

a base connected to a third side of the supporting face; and a preset angle is present between the extendable rod and the second hidden rod.

3. The reading lamp claimed as claim 2, wherein, the extendable rod further includes a second connector, and the extendable face further include a third hidden rod arranged perpendicularly, a second hidden face arranged horizontally and a third hollow rod arranged perpendicularly, wherein, an end of the second connector is connected to the other end of the first hidden rod, another end of the second connector is connected to an end of the third hidden rod;

the other end of the third hidden rod is connected to a first side of the second hidden face; a preset angle is present between the third hidden rod and the extendable rod;

a second side of the second hidden face is connected to a third side of the supporting face, wherein, the first side of the second hidden face is parallel to a second side of the second hidden face; and the second hidden face reaches into the supporting face and is movable along the second side of the supporting face.

4. The reading lamp claimed as claim 3, wherein, a sum of length of a side of the first hidden face that moves along the supporting face and length of a side of the second hidden face that moves along the supporting face is smaller than or equal to length of the second side of the supporting face;

a sum of length of the first hollow rod and length of the first hidden rod is equal to a sum of length of one of sides of the supporting face in parallel to the extendable rod, and length of one of sides of the first hidden face in parallel to the extendable rod and length of one of sides of the second hidden face in parallel to the extendable rod.

5. The reading lamp claimed as claim 4, wherein, the book support module further includes a stopping groove, wherein, the stopping groove is connected to a fourth side of the supporting face, and its size is configured to fix a book on the supporting face.

6. The reading lamp claimed as claim 3, wherein, the book support module further includes a stopping groove, wherein, the stopping groove is connected to a fourth side of the supporting face, and its size is configured to fix a book on the supporting face.

7. The reading lamp claimed as claim 2, wherein, a sum of length of the first hollow rod and length of the first hidden rod is equal to a sum of length of one of sides of the supporting face in parallel to the extendable rod and length of one of sides of the first hidden face in parallel to the extendable rod.

8. The reading lamp claimed as claim 7, wherein, the book support module further includes a stopping groove, wherein, the stopping groove is connected to a fourth side of the supporting face, and its size is configured to fix a book on the supporting face.

9. The reading lamp claimed as claim 2, wherein, the book support module further includes a stopping groove, wherein, the stopping groove is connected to a fourth side of the supporting face, and its size is configured to fix a book on the supporting face.

10. The reading lamp claimed as claim 1, wherein, the luminous module includes a pulse signal generator, a brightness control button, a pulse width modulator, a counter, a resistor, a power supply, a lamp and a triode, wherein, an output terminal of the pulse signal generator is connected to a first input terminal of the pulse width modulator;

a second input terminal of the pulse width modulator is connected to the brightness control button, an output terminal of the pulse width modulator is connected to an input terminal of the counter;

an output terminal of the counter is connected to a base of the triode, a collector of the triode is connected to an end of the resistor, and an emitter of the triode is connected to an end of the lamp;

the other end of the resistor is connected to the power supply; and the other end of the lamp is grounded.

11. The reading lamp claimed as claim 1, wherein, the splicable optical module further includes housings, a number of which is the same as that of the light guiding plates, wherein, the housings are disposed at surroundings of each of the light guiding plates.

12. The reading lamp claimed as claim 1, wherein, the plurality of light guiding plates are spliced with each other through a concave-convex matching structure.

13. The reading lamp claimed as claim 12, wherein, the concave-convex matching structure includes a rectangular protrusion and a rectangular depression.

14. The reading lamp claimed as claim 13, wherein, the concave-convex matching structure includes an I-shaped protrusion and I-shaped depression.

15. The reading lamp claimed as claim 12, wherein, the concave-convex matching structure includes an I-shaped protrusion and I-shaped depression.

16. The reading lamp claimed as claim 1, wherein, the luminous module and the splicable optical module are connected by an engaging structure.

* * * * *